July 29, 1969  E. T. Y. KWOH  3,457,852
REVERSIBLE MULTIPLE COOKING OVEN, STEAMER, GRILL AND GRIDDLE
Filed Oct. 16, 1967
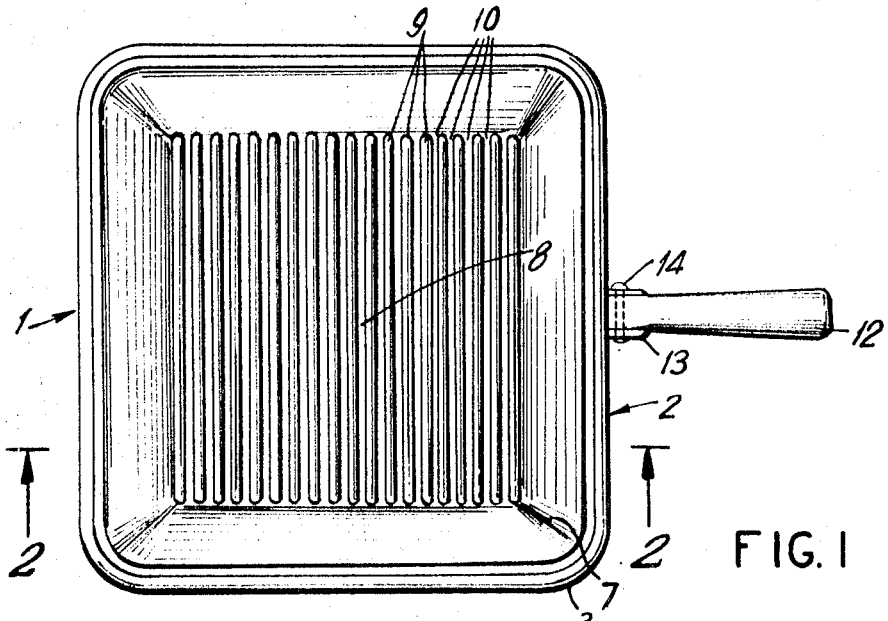
FIG. 1
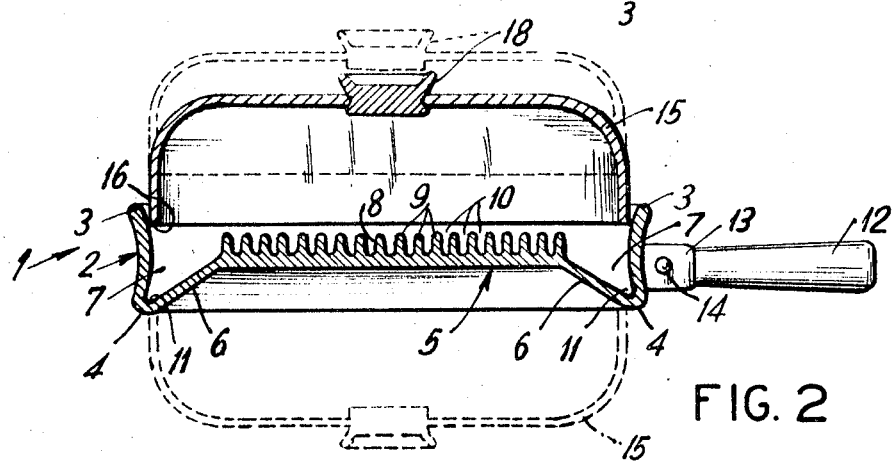
FIG. 2
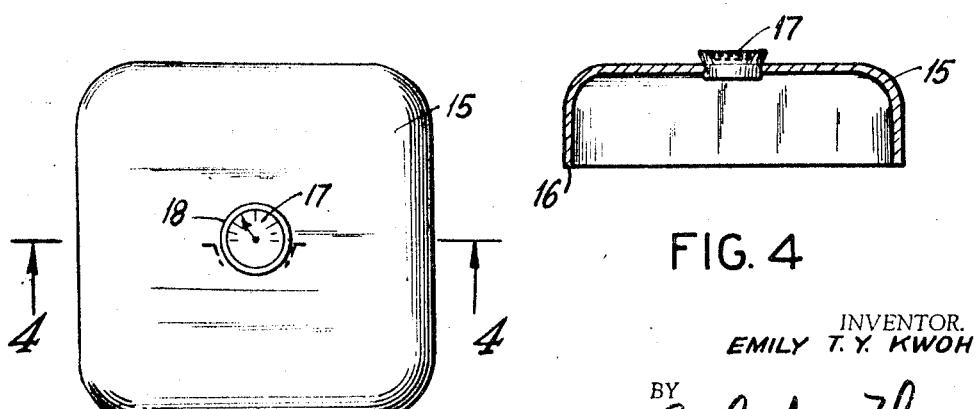
FIG. 3
FIG. 4
INVENTOR.
EMILY T. Y. KWOH
BY
ATTORNEYS

United States Patent Office 3,457,852
Patented July 29, 1969

3,457,852
REVERSIBLE MULTIPLE COOKING OVEN, STEAMER, GRILL AND GRIDDLE
Emily T. Y. Kwoh, 137 W. 13th St., New York, N.Y. 10011
Filed Oct. 16, 1967, Ser. No. 675,394
Int. Cl. A47j 27/00, 37/00; A47g 19/30
U.S. Cl. 99—340      5 Claims

ABSTRACT OF THE DISCLOSURE

A reversible multiple cooking oven, steamer, grill and griddle providing two cooking surfaces on opposite faces and in combination with a cover wherein the outer periphery of the utensil is concave and one of the cooking surfaces is raised, there being provided a trough between the raised surface and the inner side of the concave periphery. By so having a point along the inner surface of the upper edge of the concave periphery in parallel vertical alignment with a point along the outer surface of the lower edge of the concave periphery, a single cover may be employed for either of the two cooking surfaces. The cover may also include an integral thermometer.

---

The present invention relates to a reversible multiple cooking oven, steamer, grill and griddle.

The desirable cooking environment for differing foods and recipes has required housewives to maintain a varied selection of cooking utensils. Except for variation in size, the major cooking utensils may be categorized as pots and pans having enclosures or surfaces for use as grills, skillets or ovens. Each serves a distinct function, for example; the grill generally provides a ridged surface; the skillet generally provides a smooth surface; and the oven an enclosed area.

While in some cases particular foods may be cooked on a variety of surfaces, generally a particular utensil is more desirable for proper preparation of a given food and a rather expensive assortment of utensils has heretofore been required even in households where a minimal amount of cooking takes place.

In the past many devices were developed to provide for multiple usage; however, these devices were generally limited to dual functionality; that is, primarily combinations of fry pans and grills. While these devices were of some aid in reducing the number of cooking utensils needed, they were still limited in use.

A further problem which has existed in the field of cooking utensils regardless of multi-purpose use has been one of facility for cleaning. This problem is accentuated in items such as grills where accumulation of cooking residues such as fats, etc., have a tendency to build up and cake between the ridges of the grill. In an attempt to overcome the foregoing, many grills are constructed by use of a removable wire work grate and drip pan combinations. While such devices provide for separately cleaning, the grates themselves were difficult to clean, and due to the construction of the grates the force oftentimes used in cleaning damaged or distorted the grates and replacement or repair was necessitated.

Where integral ridges were employed as part of the grill there was a tendency for the cooking residues to build up between the ridges, which not only presented a problem in cleaning, but further, where the build up was sufficient to fill the valleys between the ridges during cooking, the residues were brought back into contact with the food.

According to the present invention a reversible grill pan and oven is provided which is adapted to function as a grill, skillet, and oven. By the provision of a raised grilling surface and an inclined peripheral area on the grill side, a peripheral trough for the accumulation and ready removal of cooking residues is provided. The inclined surface and side wall configuration further provides for a peripheral shape which readily adapts both the grill and skillet sides of the device of the present invention to accept a cover of the same dimensions. In such manner, a single cover may be employed either for the grill or skillet sides of the utensil to provide a varied oven surface. The trough configuration on the grill side may be employed as a receptacle for water, which due to the positioning of the raised grill portions does not contact the food, yet allows for the heating of the water, to provide, if desired, a steam atmosphere for cooking.

If desired, and to provide for greater accuracy in cooking, the cover may include an integral thermometer.

Although such novel feature or features believed to be characteristic of the invention are pointed out in the claims, the invention and the manner in which it may be carried out may be further understood by reference to the description following and the accompanying drawings.

FIG. 1 is a top view of a cooking utensil made in accordance with the teachings of the present invention.

FIG. 2 is a sectional view taken along lines 2—2 of FIG. 1.

FIG. 3 is a top view of a cover of the present invention.

FIG. 4 is a sectional view taken along lines 4—4 of FIG. 3.

Referring now to the figures in greater detail, where like reference numbers denote like parts in the various figures.

As shown in FIGS. 1 and 2, the cooking utensil of the present invention provides a body 1 which may be of any desired shape. The outer periphery 2 of the body 1 is concaved and as shown in FIG. 2 it is preferable that a point along the inner surface of the upper edge 3 of the outer periphery 2 and a point along the outer surface of the lower edge 4 of the outer periphery 2 be in substantially vertical parallel plane, so that if such points on the upper edge 3 and the lower edge 4 of the periphery 2 are employed as reference points, in cross section the body 1 defines a rectangle.

The base 5 begins at the lower edge 4 of the periphery 2, with the outer edge 6 of the base 5 extending at an upward angle from the lower edge 4 forming a trough 7 between the inner sides of the periphery 2 and the angulated outer edge 6.

The central portion 8 of the base 5 is substantially horizontal and in substantially right angle relationship to the periphery 2, the resultant structure providing a raised platform with a surrounding trough 7.

Two cooking areas are thereby provided, with the central portion 8 and trough 7 side of the body 1 providing a first cooking area, and upon reversal, the underside of the base 5 and the angulated outer edge of the base 6 providing a second, well-type cooking area, both readily acessible for use by reversal of the body 1.

As shown in FIGS. 1 and 2 the troughed side of the body 1 may include an integral grilling surface. Transverse ridges 9 are disposed preferably in parallel alignment along the upper surface of the central portion of the base 5. The upper surface of the ridges 9 act as a grilling surface or a heating base depending upon which surface of the cooking utensil is being employed. The ridges 9 are preferably spaced apart a sufficient distance to allow access for cleaning. The valleys or channels 10 between the ridges 9 act as initial reservoirs for the residue materials of the grilling foods. Substantially no build up of wastes within the channels 10 occurs since the channels 10 act as conduits to the trough 7 and excess residues run off into the trough 7.

The trough 7, which preferably is so configured as to have no sharply defined inner surface edges, the inner surface of the juncture 11 of the periphery 2 and the base 5 preferably rounded, is itself readily amenable to cleaning.

Where one of the cooking areas is grilled such as shown in FIG. 2, it is preferable that a frying or skillet surface be provided on the reverse side. If desired, however, both upper and lower surfaces of the base 5 may be either of a grilled, or skillet surface.

A handle 12 may be employed to facilitate use of the cooking utensil, and as shown in FIGS. 1 and 2, a handle bracket 13 providing a mount to dispose the handle 12 outward and at substantially a right angle to the periphery 2 may be provided, the handle 12 affixed within the bracket 13 by ordinary means such as a transverse rivet 14. It is readily aparent that a variety of handles and handle mounts of the removeable or permanently mounted variety are employable.

As shown in FIGS. 2-4, both the upper and lower cooking areas accept and retain the same size cover 15 and as such a single cover 15 may be employed for both of the cooking areas. The cover 15 is slightly smaller in cross section than the body 1 at its rim 16, the rim 16 adapted to rest upon the inner surface of the concave periphery 2 to cover one of the cooking areas, and the rim 16 adapted to rest upon the underside of the angulated outer edge 6 of the lower edge of the periphery 2 to cover the second cooking area.

Aside from its use as heretofore described, the troughed side of the cooking utensil when employed in combination with the cover 15 may be used to create a steamed chamber. A small amount of water may be placed in the trough 7 and out of direct contact with a food product such as a vegetable placed on the central portion 8 of the base 5. Upon application of heat the steam created may be employed to cook the food.

As shown in FIGS. 3 and 4 greater cooking control and accuracy, especially where the cover 15 is employed to create a baking or oven environment, is available where the cover 15 includes an integral thermometer 17.

As shown, the thermometer 17 may be integral to the cover handle 18 and is preferably centrally positioned on the cover 15 so as to place the thermometer 17 directly above the center of the base 5. This places the thermometer over the area which usually is positioned in greatest proximity to the heat source for cooking, and thereby allows for a more accurate reading of the temperature within the oven nearest the heat source.

In use, the desired cooking environment is chosen and the desired cooking area of the cooking utensil of the present invention employed.

The terms and expressions which are employed are used as terms of description; it is recognized, though that various modifications are possible within the scope of the invention claimed.

Having thus described certain forms of the invention in some detail, what is claimed is:

1. A reversible cooking utensil comprising a body portion including a surrounding concave outer periphery, a base, said base including an inclined portion beginning at the lower edge of said outer periphery and extending angularly upward within said body and a substantially horizontal central portion disposed above said base point of beginning, said inclined portion forming a trough between said horizontal central portion and said outer portion, the point of beginning of said inclined portion of said base in vertical axial alignment with the inner portion of said concave surrounding outer portion, said central base portion and said trough defining a first cooking area, the underside of said base defining a second cooking area, wherein a lid of similar peripheral dimensions is adapted to nest within said body portion on both said first and second cooking areas and handle means on said periphery extending outward therefrom for reversing said utensil.

2. The apparatus of claim 1 wherein said first cooking surface includes transverse ridges along said central portion of said base, the upper surface of each of said ridges of substantially equal height.

3. The apparatus of claim 1 in combination with a cover, said cover slightly smaller in cross section than said body at its rim, the rim of said cover adapted to rest upon the inner surface of said concave periphery to cover said first cooking area and the rim of said cover adapted to rest upon the underside of said angulated outer edge of said base inward of said lower edge of said periphery to cover said second cooking area.

4. The apparatus of claim 3 wherein said cover includes a thermometer thereon.

5. The apparatus of claim 1 wherein said first cooking area is a grill and said second cooking area is a skillet.

References Cited

UNITED STATES PATENTS

| | | | |
|---|---|---|---|
| 1,798,648 | 3/1931 | Armstrong | 99—343 |
| 2,012,151 | 8/1935 | Whittier | 99—343 XR |
| 2,061,610 | 11/1936 | Burnette. | |
| 2,840,684 | 6/1958 | Watkins | 99—425 XR |

WILLIAM I. PRICE, Primary Examiner

A. O. HENDERSON, Assistant Examiner

U.S. Cl. X.R.

99—342; 220—23.86